Sept. 1, 1964 J. A. HINLICKY ETAL 3,147,229
CATALYST PREPARATION AND ACTIVATION PROCESS
Filed June 10, 1958 2 Sheets-Sheet 2

John A. Hinlicky
Donald D. MacLaren
Fred H. Kant
Lawrence Spenadel

Inventors

By *H. M. Feyrer* Attorney

United States Patent Office 3,147,229
Patented Sept. 1, 1964

3,147,229
CATALYST PREPARATION AND ACTIVATION PROCESS
John A. Hinlicky, Irvington, Donald D. MacLaren, Scotch Plains, Fred H. Kant, Cranford, and Lawrence Spenadel, Elizabeth, N.J., assignors to Esso Research and Engineering Company, a corporation of Delaware
Filed June 10, 1958, Ser. No. 741,130
5 Claims. (Cl. 252—415)

The present invention relates to improvements both in the preparation of platinum group metal hydroforming catalysts and in the maintenance of the activity of said catalysts when they are used in cyclic operations. More particularly, the present invention relates to obtaining a more active and selective platinum catalyst by utilizing optimum analytical controls at critical points in the manufacture and in the maintenance of the activity of the catalyst. Most particularly, the present invention relates to:

(1) Controlling the extent of activation of the alumina base by checking the surface area of the base after calcination and adjusting the temperature and time of calcination responsive to said measurements, (2) Controlling the extent of platinum dispersion on the base after platinum impregnation by determining by hydrogen chemisorption the platinum surface area after calcination and adjusting calcination temperature and time responsive to this measurement, and (3) In regenerative cyclic operations controlling the extent of reactivation with halogen in an oxidizing atmosphere by checking the platinum surface area by the method described in (2) above and adjusting the temperature and time of halogen treating responsive to said measurements.

Hydroforming may be defined as an operation in which a petroleum naptha or gasoline fraction is contacted at elevated temperatures and pressures in admixture with recycled hydrogen-rich process gas with solid catalyst under conditions of temperature, pressure and contact time such that there is no net consumption of hydrogen. Hydroforming processes involving the use of Group VI metal oxides, such as molybdeum oxides on alumina, as well as platinum or Group VIII metal containing catalysts are well known. During the hydroforming reaction carbon is laid down on the catalyst and it may be necessary to remove this carbon by regenerative burning. This is accomplished in fixed bed hydroforming by shutting down the reactor, purging to remove reactant vapors and then withdrawing the catalyst and regenerating, or regenerating in situ by passing an oxygen-containing gas through the catalyst bed. In fluid bed hydroforming, spent catalyst particles are continuously withdrawn from the dense bed in the reaction zone and are passed to a spent catalyst regeneration zone where the carbonaceous deposits are removed by combustion; thereupon the regenerated catalyst particles are returned to the main reactor vessel.

It is contemplated that an improved catalyst of the present invention may contain 0.01 to 2 or even 4 or more wt. percent of platinum or palladium, preferably, from 0.1 to 2 wt. percent of platinum or from 0.5 to 3 wt. percent of palladium. It is also contemplated that catalysts may be prepared and used in this invention in which only part of the alumina is impregnated with platinum or palladium and this impregnated material is commingled with unimpregnated alumina to give a composite or "diluted" catalyst.

The alumina base for the catalyst of the present invention may be prepared by a wide variety of methods. However, since it is in the activation of the alumina by calcination and in the steps following that the present invention resides, the methods of preparation of the catalyst base will not be described in detail. It is preferred, however, to use methods which will produce a highly pure alumina, particularly an alumina prepared from the alcoholate and especially a high eta alumina. A particularly good alumina is prepared by the method outlined in U.S. Pat. 2,796,326. This process comprises reacting aluminum metal with a water insoluble anhydrous alcohol in a hydrocarbon solvent, hydrolizing the solution of aluminum alcoholate obtained with good agitation in preferably about 2 to 10 volumes of water per volume of aluminum alcoholate solution preferably at 40° to 80° F., aging the hydrated alumina slurry which is contained in the water layer for about 20–65 hours at ambient temperatures and then drying at 200°–250° F. After drying it is preferred to add an extrusion aid such as $HNO_3$, $HCl$, or $AlCl_3$ in solution and to extrude to form extrudates of a size desired for fixed bed operations, e.g. ¼" to ⅜" in length and $\frac{1}{16}$" to ⅛" in diameter.

Following the preparation of the hydrated alumina, the critical activation, which is the subject of this invention, is conducted. In this activation the hydrated alumina is calcined at a temperature and for a time controlled by testing the adsorptive alumina coming out of the calciner to determine its surface area and varying these temperature and time conditions. responsive to this measurement. These surface areas are determined by the well known modified Brunauer, Emmett, Teller method outlined in an article in Journal of the American Chemical Society, vol. 70, on page 1405, entitled "The Determination of Pore Size Distribution From Gas Adsorption Data," by C. G. Shull. For example, for essentially 100% eta alumina, as surface areas above or below 230±20 square meters per gram are obtained, the severities of calcination are increased if the former, or decreased if the latter. In each instance the object is to bring the succeeding adsorptive alumina from the continuous calciner within the 230±20 square meters per gram range.

After activation of the alumina, impregnation with platinum is conducted. The platinum may be added to the alumina in any desired manner provided that the compound used is in solution, is in very fine colloidal suspension, or is in gaseous form. For example, a very dilute impregnation solution (containing 4 grams of platinum per liter) may be prepared from chloroplatinic acid. The solution may be used by itself or in admixture with an added halide or an added halide plus an oxidizing agent. Following impregnation (and extruding or pelleting of the alumina powder if this has not already been done) the excess solution if any is drained or otherwise removed from the alumina, and the powder, pellets or extrudates are heated to dryness at temperatures of about 250° F. The second critical calcination step is now conducted. For this calcination, temperatures and times of heating of the catalyst are controlled responsive to a finding by hydrogen chemisorption of the platinum surface area of the catalyst coming out of the continuous calciner. These platinum surface areas are determined according to the method of hydrogen chemisorption described in an article in Zhur. Fiz. Khim. 26, 1814 (1952), by G. K. Boreskov and A. P. Karnaukhov. However, since the present catalyst may contain halogen, it is necessary to additionally obtain an experimental relationship between the halogen content of the alumina and the amount of hydrogen adsorbed on such a halogen containing alumina. Knowing the halogen level of the catalyst the amount of hydrogen adsorbed at that level on the alumina may be correctly backed out. This is done by subtracting the value of the hydrogen adsorbed on the particular alumina from the total hydrogen adsorbed on the catalyst determination. The hydrogen adsorbed on the platinum alone remains and from this value the platinum surface area can then be calculated. The theoretical atomic dispersion for platinum is 235 m.²/gm. The value for palladium is 426 m.²/gm. and for rhodium 420 m.²/gm.

For this second critical calcination, maximum severity conditions are desired consistent with not destroying atomic dispersion of the platinum and thus control is maintained according to the present invention by (1) decreasing severity whenever platinum surface area drops below 200±20 sq. m./gm. of platinum and (2) periodically increasing severity so as to make sure operation is at the threshold of decreasing the platinum surface area below that level. This insures that maximum volatile material is removed while maintaining maximum platinum surface area. For those catalysts made with either palladium or rhodium the surface area of the active metal is controlled at 380±38 m.²/gm.

The present catalyst is useful in regenerative operations. In these operations halogen treating in an oxidizing atmosphere is included as part of the regeneration cycle. Free halogen or a decomposable non-metallic or aluminum halide is used in an oxidizing atmosphere of if the compound contains oxygen as well as halogen an inert atmosphere can be used. Chlorine treating, for example involves treating the catalyst with about 2 wt. percent based on catalyst of chlorine by treating with a 1% chlorine as chlorine or decomposable non-metallic chloride compound and air mixture at about 800° to 1000° F. During regenerative burning to remove carbon the surface area of the platinum decreases and one or a number of high severity chlorine treats are required to restore initial activity. Following each chlorine treat, according to the present invention, a sample of catalyst is tested by hydrogen chemisorption and platinum surface area is thus determined. The catalyst is additionally chlorine treated whenever it appears from the sample that its surface area is less than 200±20 square meters per gram of platinum. Additionally, where successive chlorine treating of a particular catalyst is not required, (e.g. where the catalyst is moderately "fresh") the temperature-time setting for a chlorine treat of the next reactor from the reactor train may be determined responsive both to the experience in chlorine treating the preceding reactor from the reactor train and to the experience with chlorine treating the particular reactor when it was last off stream for regeneration. In non-regenerative operations it may also be preferred to chlorine treat the fresh catalyst according to the method described above.

It should be noted that the present invention control of the activation of the alumina base, control of the activation of the platinum after impregnation on the base, and control of the chlorine treating of the catalyst automatically compensates for variances in different batches of the material being treated and for variances in calcining and chlorine treating conditions. For example, different moisture contents of material entering the calciner and different loadings of the trays produce very different moisture contents in the air in the calciner. This of course, changes the extent of activation obtained for a set temperature-time relationship of calcining. It is thus apparent that the present automatic controls are much more effective than the manual controls known prior to the present.

The present invention will be more clearly understood from the following detailed description of the specific examples read in conjunction with the accompanying drawings of which:

EXAMPLE I

Figure 1:
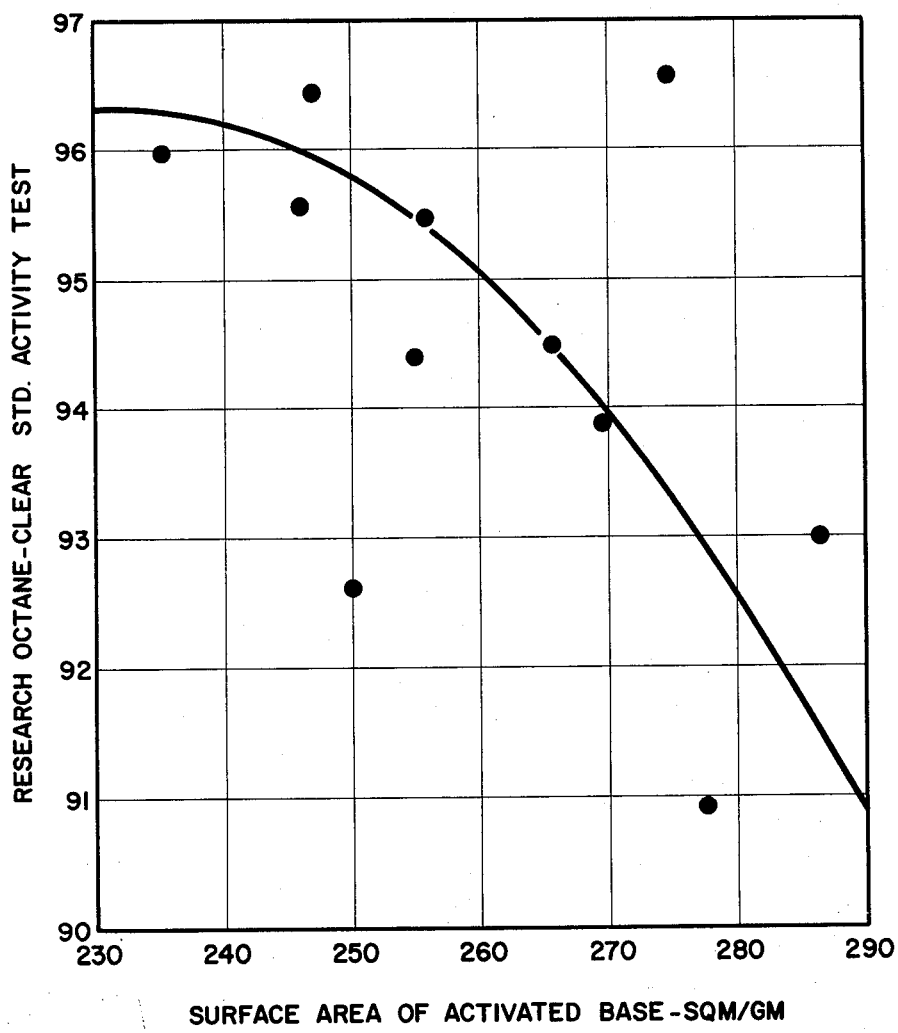
FIGURE 1 is a plot of surface areas of activated alumina bases plotted versus research octanes obtained with these bases when impregnated in the standard manner with platinum.

A solution of aluminum amylate in a petroleum distillate prepared as per Example IV of U.S. Pat. 2,636,865 was hydrolyzed by vigorously stirring the same into twice its volume of dilute ammonium hydroxide solution containing about 2.8 wt. percent ammonia at about 80° F. After aging the resultant slurry of hydrous alumina for about 9 hours to convert the hydrous alumina product principally to beta alumina trihydrate, the slurry was steam stripped free of ammonia and excess solution was decanted from the slurry. The concentrated slurry was centrifuged to remove additional solution and the slurry was then passed through a drying extruder. The ¼" diameter rods from the extruder were cut into ⅜" lengths and these pellets were then dried at 250° F. to about a 30% residual moisture level (i.e. to beta alumina trihydrate which contains about 30% water of constitution). These pellets were then granulated to pass through a 20 mesh screen and were stored in drums prior to activation.

Activation was conducted in an open end Lindberg furnace. The catalyst was placed on trays and carried through the furnace on an endless belt. The furnace consisted of seven heating zones, the first being operated at a temperature of 1000° F. and serving to remove most of the water, the second being operated at about 1100° F. and serving to raise the temperature of the catalyst to the activation level, the third through sixth being operated at about 1125° F. and serving to activate the alumina and the seventh zone being a cooling zone operating at about 150° F. The time of the entire heating cycle was approximately 4 hours, during which the catalyst was within zones 3 through 6 for about 2 hours. Samples of activated alumina were taken over a considerable period of time during which the furnace zones 3 through 6 were maintained at a constant temperature setting. It is noted that this commercial Lindberg furnace provides only a rather coarse control of temperature and that the limit of the accuracy of the furnace setting is only within a range of about 50° F. Also, when a different loading of trays entering the furnace is used, i.e. when only every other tray is loaded, the amount of moisture in the furnace air varies considerably. This, of course, changes the character of the actual heat activation of the alumina.

Samples of activated alumina were also taken four times a day over a considerable period of time during which the temperature setting of zones 3 through 6 were controlled responsive to variances in the surface area of the catalyst leaving the calciner outside the range of 230±20 sq. m./gm. This control was maintained because it has now been discovered that one of the causes for low activity in the manufacture of commerical catalysts has been insufficient activation of the alumina base. During this step in which beta alumina trihydrate is converted to eta alumina, if activation is too mild, alumina surface area in the final catalyst is too high and activity is lower than desired. Additionally, an underactivated alumina is more heat unstable and after regeneration and hydroforming service the alumina is less attrition resistant and surface area drops to below the optimum level. On the other hand, if activation is too severe, excessive loss of surface area will occur in this step producing a catalyst with a low surface area. This is undesirable since it is preferred to have as high a surface area as possible to obtain maximum halogen uptake in halogen treating. This halogen treating may be of a fresh catalyst or in cyclic operations of a regenerated catalyst. According to the present invention, as surface areas above or below 230±20 square meters/gram were obtained on catalyst leaving the calciner, temperatures were slightly raised if the former or lowered if the latter to bring the calcined later samples again within the range desired.

The coarse powder samples from the calciner taken during the time when control of calcination was by a constant temperature-time setting and during the time when it was responsive to a determination of surface area of the alumina were impregnated with 0.3 wt. percent of platinum by mixing the samples with enough of a very dilute solution of chloroplatinic acid to just wet the samples. This amount was about 65% by weight of the activated alumina. The solution contained 3 grams of platinum as chloroplatinic acid for each 650 cc. of water. The wet powder samples were allowed to air dry for 12 hours and were then dried at 250° F. for another 12 hours. Powder from each of the samples was then formed into 3/32 x 3/16" pills in pilling machines. The pills were calcined in a 7-zone open end Lindberg calciner; zones 3 through 6 being maintained at 1100° F. and the catalyst residing therein for 1 hour.

The pills from each sample of catalyst were then tested in a standard hydroforming catalyst test unit. The same feed stock and constant conditions of temperature, pressure, feed rate, and recycle gas rate were used with each catalyst tested as follows:

Feed stock—200/330° F. virgin naphtha obtained from mixed sweet Louisiana crudes.
Feed rate—6 wt. percent of feed stock/hr./wt. of catalyst.
Sand bath, temperature—940° F.
Pressure—200 p.s.i.g.
Hydrogen rate—5000 s.c.f./b. of once-through $H_2$.
Catalyst charge—150 gms. of catalyst diluted with inert electrican's beads to 500 cc.
Length of test—7 hours with product taken during hours 3-7.

Different octane ratings were thus obtained for each of the samples. In FIGURE 1 surface areas of the activated base in square meters per gram were plotted against research octane clear for a number of catalyst samples. From this diagram it can be seen that there is a trend to increased activities as surface area of the activated base is decreased and that this activity levels off at surface areas less than about 230 square meters/gram.

Figure 2:
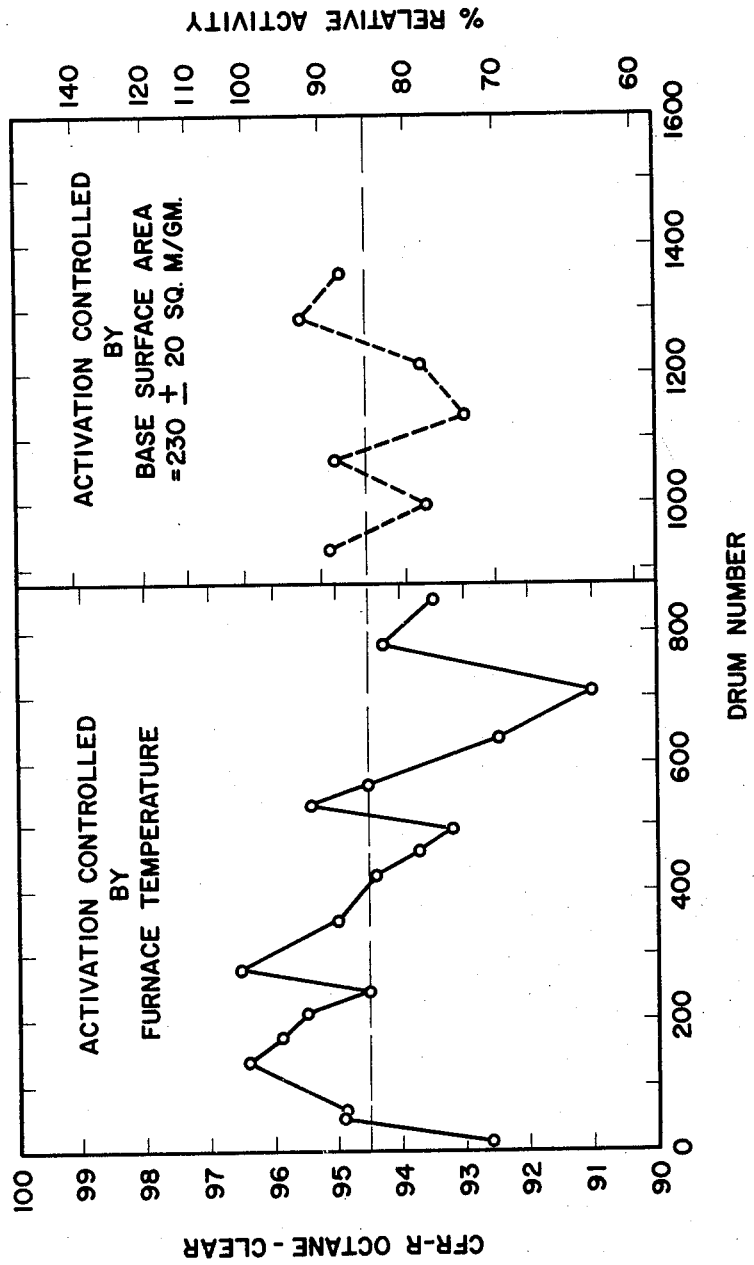
FIGURE 2 is a plot of research octanes obtained with these impregnated aluminas plotted against time sequence including both times during which catalyst manufacture was controlled by a constant setting of furnace temperatures and during which control was by changing temperatures responsive to determination of alumina base surface areas.

In FIGURE 2 are plotted research octanes obtained on consecutively taken samples of catalyst chronologically plotted showing activities of catalyst obtained when constant furnace temperatures were used and when furnace temperatures were controlled four times per day responsive to surface area measurements. It can be seen that control of catalyst activity was greatly improved following the use of the latter method.

EXAMPLE II

Samples of alumina prepared as in Example I, activated under the constant temperature not responsive to surface area control method, were also impregnated according to the method of Example I. These samples were then pilled as previously described and were calcined under different conditions in the Lindberg 7-zone calciner. Thus separate samples were calcined at temperatures of 1000°, 1200° and 1250° F. in the calcination zones, i.e. 3 through 6 for a total of 60 minutes in these zones. In addition the 1250° F. calcined sample was also given a 2-hour heat soak after calcination. Surface areas of the platnium were determined by the method of hydrogen chemisorption previously referred to. These surface area of the platinum measurements are in square meters per gram of platinum in the catalyst. Thus the total platinum surface area is very different from the total surface area of the impregnated alumina which is expressed as square meters/gram of alumina. It should be noted that it has now been discovered that catalyst activity is markedly reduced when platinum surface areas smaller than 200 square meters per gram of platinum are produced by too severe calcination. Prior to the present it has been known that surface area should not be allowed to decrease below 55 square meters/gram of platinum the limit of measurability by X-ray diffraction but it was not known that increased activity could be obtained by controlling surface area within the higher surface area range not previously detectable. This limit of measurability of surface area was usually expressed as that platinum crystal size smaller than 50 A., equivalent to 55 square meters/gram, was not detectable.

The catalysts given the calcination treatment previously described were tested for catalyst activity in the standard catalyst testing unit as described in Example I. Data on platinum surface area and on catalyst activity are reported in Table 1.

Table 1

| Catalyst | Calcination Temp., °F. | Platinum Surface Area (m.²/g.) | Catalyst Activity (Research Octane No. Clear) |
|---|---|---|---|
| Platinum on Eta Alumina | 1,000 | 235 | 93 |
|  | 1,100 | 210 | 96.5 |
|  | 1,200 | 165 | 95 |
|  | ¹ 1,250 | 35 | Ca. 92 |

¹ Heat soak 2 hrs. after calc.

It can be seen from these data that there is a critical calcination temperature of about 1100° F. producing a platinum surface area of about 200 square meters/gram of platinum and a maximum catalyst activity. It should also be noted that when the catalyst is under-calcined, as shown at a temperature of 1000° F. the platinum surface area is high but the activity decreases due to incomplete removal of volatile matter. It is, therefore, critical to maintain platinum surface area at about 200±20 square meters per gram of platinum.

EXAMPLE III

An impregnated alumina prepared as in Example II is calcined in an open end Lindberg calciner containing 7 zones. The calcination heating procedure in zones 3-6 is conducted for a total of about 1 hour. Zones 1, 2 and 7 are operated at temperatures of 600°-800° F. and 150° F. respectively. Surface area of the platinum measurements are made four times per day on the catalyst as it emerges from the calciner. When these measurements show a catalyst platinum surface area above the upper limit of 200±20 square meters/gram, the temperature in zones 3 through 6 is increased slightly. When the platinum surface area falls below 200±20 square meters per gram the temperature in zones 3 through 6 is decreased slightly. None of the catalyst from the calciner is rejected since it is all at relatively high quality even when not optimum. After calcination the catalyst is then stored in airtight drums until used in commercial hydroforming.

EXAMPLE IV

Catalyst prepared as in Example III is used in cyclic or semi regenerative hydroforming. After reaction has proceeded for a considerable time and activity has decreased, one of the reactors from the four-reactor train is removed and another reactor is swung in its place. The removed reactor is purged with nitrogen or inert flue gas and is then regenerated with inert gas containing about 2 mol percent oxygen until the primary burning wave passes through the reactor. Temperature is controlled to 1050° F. maximum. Oxygen content is gradually increased to about 20% while regeneration is controlled so that maximum temperature does not exceed 1050° F. Thus regeneration temperatures are controlled so that they do not exceed the original calcination temperatures and thus even over long periods of cyclic operation surface areas of the alumina are not decreased appreciably. 1 mol percent chlorine as free chlorine or a decomposable chlorine containing compound in air at about 900° F. is introduced until a total of 2 wt. percent chlorine on catalyst passes over the catalyst after which a sample of catalyst is removed from the reactor. This sample is tested for platinum surface area by the hydrogen chemisorption technique described above and if this surface area is below 200±20 square meters/gram of platinum the reactor catalyst charge is further chlorine treated with another 2 wt. percent chlorine on catalyst. The catalyst is again tested and if the platinum surface area is still below 200±20 square meters/gram the catalyst is further chlorine treated. This further chlorine treat may be made preferably at a higher temperature e.g. about 1000° F. The catalyst is then contacted with air containing about 20% oxygen at 900°–1100° F. for about 1 to 4 hours, is purged with nitrogen at about 900° F. and with hydrogen and is then swung back in to the reactor train where it replaces the swing reactor previously mentioned. It should be noted that the different reactors, depending upon their place in the reactor train, suffer different degrees of deactivation and carbon laydown, and that, therefore, methods other than the surface area measurement to control the extent of chlorine reactivation are far less precise than the present method. It is apparent that the present invention provides a simple method for determining when the catalyst has been returned by sufficient chlorine treating to its maximum activity level. It may then, of course, be returned to hydroforming service in its optimum reactive stage.

It is to be understood that this invention is not limited to the specific examples, which have been offered merely as illustrations, and that modifications may be made without departing from the spirit of the invention.

What is claimed is:

1. In the manufacture of a halogen containing catalyst comprising an active metal selected from the group consisting of platinum, palladium and rhodium dispersed on an alumina base, the improvements which comprise: (1) in the activation of the alumina base by calcining same, measuring at regular intervals the surface area of the calcined alumina as said alumina exits from the calciner and increasing or decreasing the severity of calcination as the surface area is found to be respectively above or below 230±20 sq. meters per gram of alumina, (2) in the activation of the catalyst by calcination at a temperature above about 1000° F. following impregnation of the alumina base with the active metal, measuring the surface area of the active metal on the alumina base at regular intervals as the catalyst exits from the calciner and increasing or decreasing the severity of calcination as active metal surface area is found to be respectively above or below 200±20 square meters per gram for platinum and 380±38 sq. m./gm. for palladium and rhodium and (3) in the halogen treating of the catalyst measuring the surface area of the active metal after halogen treating the catalyst and controlling the severity of the halogen treatment to obtain an active metal surface area of 200±20 square meters per gram of platinum and 380±38 square meters per gram of palladium or rhodium.

2. In the manufacture of a halogen containing catalyst comprising an active metal selected from the group consisting of platinum, palladium and rhodium dispersed on a high purity alumina base, the improvements which comprise: (1) in the activation of the alumina base by calcining same, measuring at regular intervals the surface area of the calcined alumina as said alumina exits from the calciner and increasing or decreasing the severity of calcination as the surface area is found to be respectively above or below 230 plus or minus square meters per gram of alumina, and (2) in the activation of the catalyst by calcination at a temperature above about 1000° F. following impregnation of the alumina base with the active metal, measuring the surface area of the active metal on the alumina base by the hydrogen chemisorption technique at regular intervals at the catalyst exits from the calciner and increasing or decreasing the severity of calcination as the active metal surface area is found to be respectively above or below 200 plus or minus 20 square meters per gram for platinum and 380±38 m.²/gm. for palladium and rhodium.

3. In the manufacture of a catalyst comprising an active metal selected from the group consisting of platinum, palladium and rhodium dispersed on an alumina base, the improvement which comprises in the activation of the catalyst by calcination at a temperature above about 1000° F. following impregnation of the alumina base with the active metal, measuring the surface area of the active metal on the aluminum base by the hydrogen chemisorption technique at regular intervals as the catalyst exits from the calciner and increasing or decreasing the severity of calcination as the active metal surface area is found to be respectively above or below 200±20 square meters per gram of platinum and 380±38 m.²/gm. for palladium or rhodium.

4. In the manufacture of a halogen containing catalyst comprising an active metal selected from the group consisting of platinum, palladium and rhodium dispersed on an alumina base, the improvements which comprise: (1) in the activation of the catalyst by calcination at a temperature above about 1000° F. following impregnation of the alumina base with the active metal, measuring the surface area of the active metal on the alumina base by the hydrogen chemisorption technique at regular intervals as the catalyst exits from the calciner and increasing or decreasing the severity of calcination as the active metal surface area is found to be respectively above or below 200±20 square meters per gram for platinum and 380±38 m.²/gm. for palladium and rhodium and (2) in the halogen treating of the catalyst measuring the surface area of the active metal by the hydrogen chemisorption technique after halogen treating the catalyst and controlling the severity of the halogen treatment to obtain an active metal surface area of 200±20 square meters per gram of platinum and 380±38 square meters per gram of palladium or rhodium.

5. In the maintenance of the activity of a halogen containing catalyst comprising an active metal selected from the group consisting of platinum, palladium and rhodium dispersed on a porous alumina base, the improvement which comprises in the halogen treating of the catalyst following regeneration measuring the surface area of the active metal by the hydrogen chemisorption technique after halogen treating the catalyst and controlling the severity of said halogen treating to obtain an active metal surface area of 200±20 square meters per gram of platinum and 380±38 square meters per gram of palladium or rhodium.

References Cited in the file of this patent

UNITED STATES PATENTS

| | | |
|---|---|---|
| 2,611,736 | Haensel | Sept. 23, 1952 |
| 2,759,897 | Haensel | Aug. 21, 1956 |
| 2,802,794 | Sprauer | Aug. 13, 1957 |
| 2,838,445 | Teter | June 10, 1958 |
| 2,898,387 | Teter | Aug. 4, 1959 |
| 2,911,451 | Haensel | Nov. 3, 1959 |